June 13, 1939.   LE ROY S. DUNHAM ET AL   2,161,953
ROTOR FOR MAGNETO ELECTRIC GENERATOR
Filed March 12, 1937
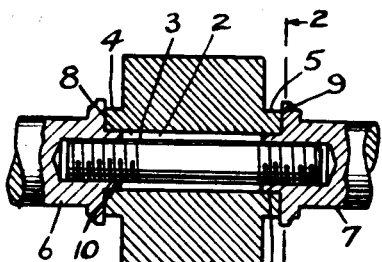
Fig. 1
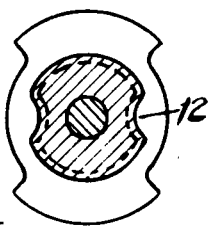
Fig. 2
Fig. 3
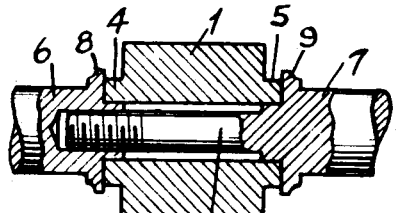
Fig. 4
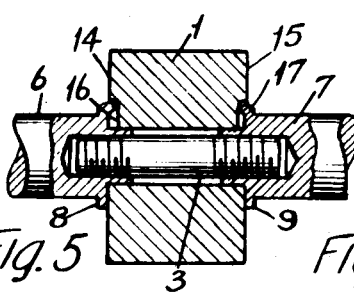
Fig. 5
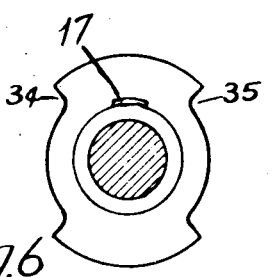
Fig. 6
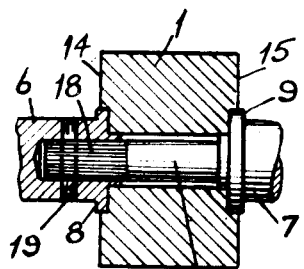
Fig. 7
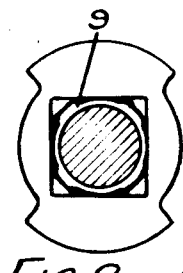
Fig. 8
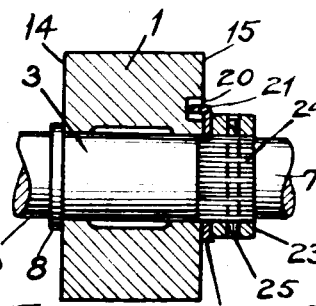
Fig. 9
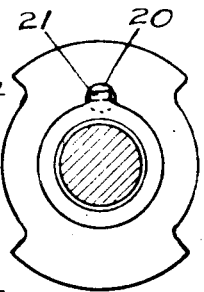
Fig. 10
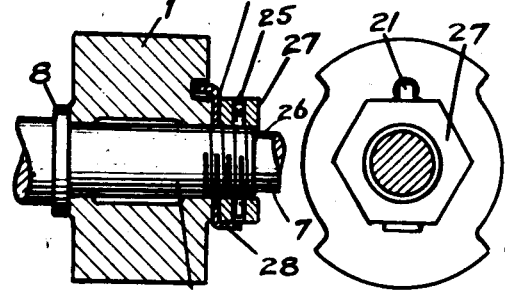
Fig. 11   Fig. 12
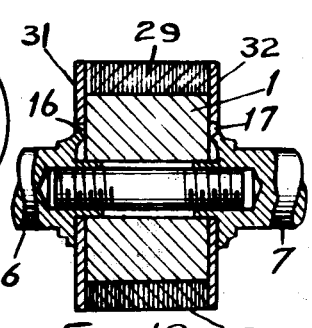
Fig. 13
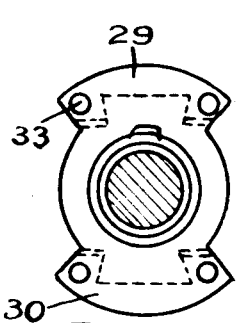
Fig. 14
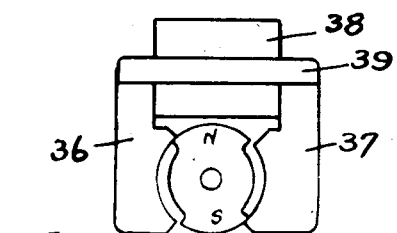
Fig. 15
INVENTORS
Le Roy S. Dunham
Arthur F. Robertson
BY
A. D. T. Libby
ATTORNEY Patented June 13, 1939

2,161,953

UNITED STATES PATENT OFFICE 2,161,953

ROTOR FOR MAGNETO ELECTRIC GENERATOR

Le Roy S. Dunham, East Orange, and Arthur F. Robertson, Belleville, N. J., assignors to Edison-Splitdorf Corporation, West Orange, N. J., a corporation of New Jersey Application March 12, 1937, Serial No. 130,496

9 Claims. (Cl. 171—209)

This invention relates to the construction of a rotor for a magneto electric generator such as is used for furnishing ignition current for internal combustion engines. In our application Serial No. 26,686, filed June 14, 1935, now Patent 2,081,800, issued May 25, 1937, we have shown and described a special type of magneto, in which the rotor includes a permanent magnet made out of a strongly magnetic material such as an alloy containing nickel, aluminum, iron, and sometimes cobalt. However, the exact composition of the magnetic material is not the important point and we are familiar with other suitable magnetic materials, such as strongly magnetic steel alloys, mixtures of powdered oxides compressed and bound together, and other relatively new permanent magnet compositions. A rotor composed of these materials is usually cast in a suitable mould, but some of the materials may be used in finely divided form and compressed in a die or the like. In either case, we cast a hole at the axial center of the magnet in order to attain a double purpose; first, to provide for the reception of a through shaft assembly, and second, to economize on the magnetic material at this central neutral point. Furthermore, the rotor magnet is preferably cast in such a way as to avoid as far as possible all machine work thereon because the magnet after being completed is so hard as to prevent ordinary machine operations thereon, grinding being the only satisfactory way so far found of operating on a magnet made of these materials.

In our patent heretofore referred to, we have disclosed one or more means for attaching shaft ends to a rotary magnet of this type. It is an object of our present invention to provide other satisfactory means of making a rotor including a magnet and its associated shaft or shaft ends for this type of magnet.

It is another object of our present invention to provide other means of constructing a rotor still embodying a through shaft construction wherein the shaft members, either as integral parts or as an assembled group, traverse the whole rotor from end to end.

It is a still further object of this invention to provide other means for constructing rotors of small size, as used in many magnetos, which, while having a through shaft, have magnets with an axial hole smaller in diameter than the diameter of the shaft extensions. While economy of magnetic material at the axis, which is magnetically more or less neutral, can be achieved to some degree, small rotors may not be robbed too greatly even at the axis, else too little magnet material will be left. It should be noted that it is customary for the shaft ends to be of standard size, regardless of the rotor size, in order to fit other external fittings of standard size.

Our invention will be best understood by reference to the annexed drawing wherein:

Figure 1 is a sectional view through the rotor and shaft ends attached thereto.

Figure 2 is a view on the line 2—2 of Figure 1.

Figure 3 is an elevational view of the rotor shown in Figures 1 and 2.

Figure 4 is a view similar to Figure 1 but showing a modified method of attaching the shaft ends to the magnet.

Figure 5 is a view similar to Figure 4 but of a further modified form.

Figure 6 is an end view of Figure 5.

Figure 7 is a view similar to Figure 4 but of a modified form of construction.

Figure 8 is an end view of the right-hand end of Figure 7.

Figure 9 is a view similar to Figure 7 but showing a slightly modified construction.

Figure 10 is an end view of Figure 9.

Figure 11 is a view similar to Figure 9 but showing a further modification.

Figure 12 is a view of the right-hand end of Figure 11.

Figure 13 is a sectional view of a construction somewhat similar to Figure 1 but showing certain pole pieces added to the rotor magnet.

Figure 14 is an end view of Figure 13, and

Figure 15 is a diagrammatic view of a magneto system utilizing the rotor of our construction.

In the various views wherein like numbers refer to corresponding parts, 1 is a permanent magnet made of the material hereinbefore described, having a hole 2 therethrough to receive a shaft member 3 which is threaded at both ends. The magnet 1 has hubs 4 and 5 extending therefrom so that in assembly of the magnet to the shaft ends 6 and 7, the only machine work required is the grinding of the end faces of the hubs 4 and 5 to get a smooth surface for the flanges 8 and 9. The shaft ends 6 and 7 are provided with annular projections 10 and 11 which extend within the hole 2 and preferably engaging the inner periphery of the hole so as to give a better support for the ends of the magnet 1 on the shaft ends 6 and 7 which are screwed up as hard as possible onto the threaded ends of the shaft member 3 after which one or more portions 12 of the flanges 8 and 9 are indented into the respective recesses 13 in the hubs 4 and 5 thereby locking the shaft ends securely in position to prevent any relative rotary movement between the shaft ends and the magnet 1.

In Figure 4 one of the shaft ends, for example 7, has the shaft member 3 integral therewith, while the other end is threaded to receive the other shaft end, for example 6. The flanges 8 and 9 are locked to the hubs 4 and 5 the same as in Figures 1 to 3.

In Figure 5, the shaft ends 6 and 7 are attached to the shaft member 3 as in Figure 1 but the magnet 1 has its end faces 14 and 15 formed or ground to a flat face to receive the flanges 8 and 9. In this case a recess 16 is cast or formed directly in the end faces 14 and 15 and a portion 17 of each of the flanges 8 and 9 is forced into this recess as shown in Figure 6.

In Figure 7 the magnet 1 has end faces 14 and 15 the same as in Figure 5 but these faces are provided with recesses which may be circular or polygonal in shape as they need not be ground to receive the flanges 8 and 9 of the shaft ends 6 and 7. In this case the shaft member 3 is integral with the member 7 as in Figure 4 but instead of the opposite end being threaded its knurls 18 or the equivalent are forced into the shaft end 6 after which a pin 19 is passed through the shaft end 6 and the knurled part 18 of the shaft member 3. Both the flanges 8 and 9 are upset into the recesses provided. The flanges 8 and 9 may be circular or polygonal in shape but in either case the upsetting operation positively prevents relative rotary movement between the magnet 1 and the shaft end.

In Figure 9 the magnet 1 is shown with the shaft member 3 of approximately the same size as the hole in the magnet, the flange 8 engaging the end face 14 while the end face 15 of the magnet is provided with a recess 20 to receive a lug 21 integral with a lock washer 22 held in place by a member 23 forced onto the knurled portion 24 of the shaft end 7, a pin 25 being used to anchor the member 23 to the shaft end 7.

In Figure 11 the construction is quite similar to that shown in Figure 9 except the shaft end 7 is threaded at 26 to receive a nut 27, a pin 25 going through the nut 27 and the shaft end 7 being used to hold the nut securely in place. In place of the pin 25 the washer 22 may have a lug 28 bent over the nut after the same has been turned to full locking position.

In Figure 13 the poles of the magnet 1 are provided with laminated pole pieces 29 and 30 which are preferably dove-tailed thereon and held between the end plates 31 and 32 by means of rivets 33 or the like. The shaft ends 6 and 7 are fastened together somewhat as shown in Figure 5. However, in Figure 13 the recesses 16 are in the end plates and the portions 17 of the flanges 8 and 9 are forced into these recesses after the shaft ends 6 and 7 have been turned to locking position.

In all of these figures, the magnet shown is of a two-pole type having spaced recesses 34 and 35 forming the poles of the magnet, but it is to be understood that the magnet 1 may be constructed with a plurality of pairs of poles and that the localization of magnetism at useful poles may be arrived at by any suitable means other than the spaced recesses 34 and 35 which are cast therein. However, when a two-pole magnet is used the stationary system is preferably of the type as illustrated in Figure 15 in which the pole pieces 36 and 37 carry a stationary coil 38 having a core 39 in cooperative relationship with the pole pieces 36 and 37.

From what has been said it will be understood that certain details may be varied without departing from the spirit of our invention or the scope of the appended claims.

What we claim is:

1. In a magneto electric generator having a relatively stationary system including a coil and members of magnetic material for gathering and sending flux therethrough; a rotary permanent magnet for supplying magnetic flux to said system, said magnet having a centrally located hole therethrough, said magnet having formations at each end to be engaged by shaft parts, and shaft parts having portions extending into the hole in the magnet and engaging the inner periphery of said hole, means for anchoring said shaft parts to said magnet end formations and a stud for connecting said shaft parts located in said magnet hole and having a diameter smaller than said shaft part portions which are located in the hole.

2. In a magneto electric generator having a relatively stationary system including a coil and members of magnetic material for gathering and sending flux therethrough; a rotary permanent magnet for supplying magnetic flux to said system, said magnet having a centrally located hole therethrough, said magnet being made with formations at each end to be engaged by shaft parts, and shaft parts engaging said formations, a member extending through the hole and serving to connect said shaft parts together, said shaft parts having portions extending into the hole and engaging the inner periphery thereof, and means for anchoring said shaft parts to said magnet end formations to prevent relative rotation therebetween.

3. A magneto rotor construction as set forth in claim 2, further characterized in that said member extending through the hole in the magnet is integral with one shaft part, while the other end is provided with means for attachment to the other shaft part.

4. In a magneto electric generator having a relatively stationary system including a coil and members of magnetic material for gathering and sending flux therethrough; a rotary permanent magnet for supplying magnetic flux to said system, said magnet having a centrally located hole therethrough, said magnet being made at both ends with recesses extending toward each other and located inside the end faces of the magnet, shaft ends having portions forced into said recesses to securely anchor the magnet to the shaft ends and rigid connecting means joining said shaft ends through said magnet hole.

5. A magneto rotor structure as set forth in claim 4, further characterized in that one shaft end is reduced in diameter and this reduced end extends through the hole in the magnet and into the other shaft end and is fastened thereto.

6. In a magneto electric generator having a relatively stationary system including a coil and members of magnetic material for gathering and sending flux therethrough; a rotary permanent magnet for supplying magnetic flux to said system, said magnet having a centrally located hole therethrough and having spaced recesses forming poles, said magnet being made with substantially flat end faces at both ends and extending the full diameter of the magnet, and a shaft member going through the hole and having means for directly gripping the magnet on both faces, including means to prevent relative turning between the magnet and shaft members.

7. In a magneto electric generator having a relatively stationary system including a coil and members of magnetic material for gathering and sending flux therethrough; a rotary permanent magnet for supplying magnetic flux to said system, said magnet having a centrally located hole therethrough, said magnet being made with hubs at each end with at least one recess therein, a stud located in said hole and threaded at both ends, and a stub shaft screwed to each end of the stud and having a portion engaging its cooperative magnet hub, and a further portion entering the hole in the magnet and engaging the inner periphery of said hole, a part of said hub-engaging portion being indented into its hub recess to prevent relative rotary motion between the magnet and the shaft end.

8. A magneto rotor construction as set forth in claim 3, further characterized in that said member extending through the hole in the magnet is integral with one shaft part, while the other end is threaded and engages a threaded hole in the other shaft part.

9. A magneto rotor construction as set forth in claim 1, further characterized in that said anchoring means includes locking recesses in the end of the magnet, and a flange on each shaft part which is deformed into said recess.

LE ROY S. DUNHAM.
ARTHUR F. ROBERTSON.